US006832141B2

(12) United States Patent
Skeen et al.

(10) Patent No.: US 6,832,141 B2
(45) Date of Patent: Dec. 14, 2004

(54) MODULE FOR MONITORING VEHICLE OPERATION THROUGH ONBOARD DIAGNOSTIC PORT

(75) Inventors: Michael Skeen, Alameda, CA (US); Joel Wacknov, Thousand Oaks, CA (US); Paul Mohr, Mountain View, CA (US)

(73) Assignee: Davis Instruments, Hayward, CA (US)

( * ) Notice: Subject to any disclaimer, the term of this patent is extended or adjusted under 35 U.S.C. 154(b) by 0 days.

(21) Appl. No.: 10/281,330

(22) Filed: Oct. 25, 2002

(65) Prior Publication Data

US 2004/0083041 A1 Apr. 29, 2004

(51) Int. Cl.[7] .................................................. G06F 19/00
(52) U.S. Cl. ............................ 701/35; 701/33; 340/439
(58) Field of Search .............................. 701/35, 29, 33; 369/21; 340/439; 307/10.1

(56) References Cited

U.S. PATENT DOCUMENTS

| | | | | | |
|---|---|---|---|---|---|
| 4,939,652 | A | * | 7/1990 | Steiner | 701/35 |
| 5,278,759 | A | * | 1/1994 | Berra et al. | 701/1 |
| 5,459,660 | A | * | 10/1995 | Berra | 701/33 |
| 5,797,134 | A | | 8/1998 | McMillan et al. | |
| 5,862,500 | A | * | 1/1999 | Goodwin | 701/35 |
| 5,936,315 | A | * | 8/1999 | Lais | 307/10.1 |
| 6,064,970 | A | | 5/2000 | McMillan et al. | |
| 6,073,063 | A | | 6/2000 | Leong Ong et al. | |
| 6,141,609 | A | * | 10/2000 | Herdeg et al. | 701/35 |
| 6,226,577 | B1 | * | 5/2001 | Yeo | 701/35 |
| 6,263,268 | B1 | * | 7/2001 | Nathanson | 701/29 |
| 6,366,207 | B1 | | 4/2002 | Murphy | |
| 6,611,740 | B2 | * | 8/2003 | Lowrey et al. | 701/29 |
| 6,629,029 | B1 | | 9/2003 | Giles | |
| 2002/0016655 | A1 | | 2/2002 | Joao | |

FOREIGN PATENT DOCUMENTS

DE 3839221 A1 * 2/1990

OTHER PUBLICATIONS

Davis Instruments Hayward "DriveRight®," at <<http://www.davisnet.com/drive/index.asp>> visited on Jan. 14, 2003, 1 page total.

* cited by examiner

*Primary Examiner*—Michael J. Zanelli
(74) *Attorney, Agent, or Firm*—William Michael Hynes; Townsend and Townsend and Crew LLP

(57) ABSTRACT

An onboard diagnostic memory module is configured to plug into the OBD II port and has a real-time clock and power supply, a microprocessor powered from a standard OBD II port, microprocessor operating firmware, and an attached memory (7 MB). In operation, the onboard diagnostic memory module is preprogrammed with data collection parameters through microprocessor firmware by connection to a PC having programming software for the module firmware. Thereafter, the onboard diagnostic memory module is moved into pin connection with the OBD II port of a vehicle. Data is recorded on a "trip" basis, preferably using starting of the engine to define the beginning of the trip and stopping of the engine to define the end of the trip. Intelligent interrogation occurs by interpretive software from an interrogating PC to retrieve a trip-based and organized data set including hard and extreme acceleration and deceleration, velocity (in discrete bands), distance traveled, as well as the required SAE-mandated operating parameters.

13 Claims, 18 Drawing Sheets

View / Trip Log / Trip 6 / Table

| | Elasped Time | Speed MPH | Engine Speed RPM | Coolant Temperature °F | Engine Load % | Battery Voltage V |
|---|---|---|---|---|---|---|
| 1 | 0:00:00 | 0 | 1,427 | 109.4 | 35.69 | 14.095 |
| 2 | 0:00:09 | 0 | 1,108 | 107.6 | 41.18 | 14.140 |
| 3 | 0:00:19 | 0 | 1,075 | 107.6 | 42.75 | 14.117 |
| 4 | 0:00:29 | 0 | 1,082 | 107.6 | 41.96 | 14.140 |
| 5 | 0:00:38 | 0 | 1,092 | 107.6 | 41.57 | 14.117 |
| 6 | 0:00:48 | 0 | 1,104 | 109.4 | 40.78 | 14.140 |
| 7 | 0:00:58 | 0 | 943 | 111.2 | 44.71 | 14.140 |
| 8 | 0:01:07 | 1 | 997 | 111.2 | 41.57 | 14.140 |
| 9 | 0:01:17 | 3 | 1,012 | 113.0 | 42.75 | 14.117 |
| 10 | 0:01:27 | 8 | 1,129 | 114.8 | 55.69 | 14.185 |
| 11 | 0:01:36 | 13 | 1,565 | 116.6 | 38.04 | 14.185 |
| 12 | 0:01:46 | 15 | 1,617 | 118.4 | 31.76 | 14.208 |
| 13 | 0:01:56 | 14 | 1,381 | 120.2 | 33.33 | 14.095 |
| 14 | 0:02:05 | 6 | 775 | 122.0 | 74.12 | 14.095 |
| 15 | 0:02:15 | 9 | 2,293 | 123.8 | 22.35 | 14.163 |
| 16 | 0:02:25 | 17 | 2,250 | 125.6 | 48.24 | 14.185 |
| 17 | 0:02:34 | 22 | 1,455 | 127.4 | 34.12 | 14.208 |
| 18 | 0:02:44 | 23 | 1,641 | 129.4 | 29.02 | 14.163 |
| 19 | 0:02:54 | 21 | 1,325 | 131.0 | 33.73 | 14.095 |
| 20 | 0:03:03 | 16 | 1,278 | 131.0 | 37.65 | 14.185 |
| 21 | 0:03:13 | 14 | 1,260 | 134.6 | 34.12 | 14.140 |
| 22 | 0:03:23 | 9 | 952 | 134.6 | 38.82 | 14.095 |
| 23 | 0:03:32 | 1 | 911 | 136.4 | 38.04 | 14.027 |
| 24 | 0:03:42 | 0 | 869 | 136.4 | 38.82 | 14.095 |
| 25 | 0:03:52 | 0 | 870 | 136.4 | 38.43 | 14.095 |
| 26 | 0:04:01 | 0 | 845 | 138.2 | 38.43 | 14.185 |
| 27 | 0:04:11 | 0 | 861 | 138.2 | 38.82 | 14.185 |
| 28 | 0:04:21 | 0 | 863 | 140.0 | 39.22 | 14.163 |
| 29 | 0:04:30 | 1 | 900 | 140.0 | 46.27 | 14.185 |
| 30 | 0:04:40 | 9 | 1,429 | 143.6 | 74.51 | 14.095 |
| 31 | 0:04:50 | 19 | 1,641 | 143.6 | 53.33 | 14.163 |

*FIG. 8C*

View / Trip Log / Trip 13 / Table

| | Elasped Time | Speed MPH |
|---|---|---|
| 1 | 0:00:00 | 0 |
| 2 | 0:00:06 | 0 |
| 3 | 0:00:12 | 0 |
| 4 | 0:00:18 | 0 |
| 5 | 0:00:24 | 0 |
| 6 | 0:00:30 | 0 |
| 7 | 0:00:36 | 0 |
| 8 | 0:00:42 | 1 |
| 9 | 0:00:48 | 0 |
| 10 | 0:00:54 | 2 |
| 11 | 0:01:00 | 1 |
| 12 | 0:01:06 | 10 |
| 13 | 0:01:12 | 14 |
| 14 | 0:01:18 | 7 |
| 15 | 0:01:24 | 21 |
| 16 | 0:01:30 | 30 |
| 17 | 0:01:36 | 33 |
| 18 | 0:01:42 | 32 |
| 19 | 0:01:48 | 29 |
| 20 | 0:01:55 | 29 |
| 21 | 0:02:01 | 29 |
| 22 | 0:02:07 | 29 |
| 23 | 0:02:13 | 31 |
| 24 | 0:02:19 | 30 |
| 25 | 0:02:25 | 31 |
| 26 | 0:02:31 | 31 |
| 27 | 0:02:37 | 31 |
| 28 | 0:02:43 | 28 |
| 29 | 0:02:49 | 12 |
| 30 | 0:02:55 | 1 |
| 31 | 0:03:01 | 0 |

*FIG. 8D*

View / Trip Log / Trip 1 / Table

| | Elasped Time | Speed MPH | Engine Speed RPM | Engine Load % | Coolant Temperature °F |
|---|---|---|---|---|---|
| 1 | 0:00:00 | 0 | 821 | 6.67 | 77.0 |
| 2 | 0:00:08 | 0 | 821 | 6.67 | 77.0 |
| 3 | 0:00:16 | 0 | 801 | 6.27 | 78.8 |
| 4 | 0:00:24 | 2 | 792 | 6.27 | 80.6 |
| 5 | 0:00:32 | 9 | 1,118 | 10.59 | 84.2 |
| 6 | 0:00:41 | 17 | 1,691 | 16.47 | 86.0 |
| 7 | 0:00:49 | 31 | 2,013 | 27.06 | 89.6 |
| 8 | 0:00:57 | 37 | 2,003 | 24.71 | 93.2 |
| 9 | 0:01:05 | 39 | 1,812 | 21.18 | 98.6 |
| 10 | 0:01:13 | 37 | 1,525 | 13.73 | 102.2 |
| 11 | 0:01:22 | 1 | 1,269 | 7.06 | 107.6 |
| 12 | 0:01:30 | 12 | 780 | 6.27 | 109.4 |
| 13 | 0:01:38 | 33 | 2,180 | 30.98 | 113.0 |
| 14 | 0:01:46 | 26 | 1,893 | 16.08 | 116.6 |
| 15 | 0:01:54 | 14 | 1,218 | 12.16 | 120.2 |
| 16 | 0:02:03 | 0 | 802 | 6.27 | 123.8 |
| 17 | 0:02:11 | 0 | 741 | 5.88 | 125.6 |
| 18 | 0:02:19 | 0 | 730 | 5.49 | 125.6 |
| 19 | 0:02:27 | 0 | 719 | 5.49 | 127.4 |
| 20 | 0:02:36 | 0 | 708 | 5.49 | 129.2 |
| 21 | 0:02:44 | 19 | 727 | 5.49 | 131.0 |
| 22 | 0:02:52 | 34 | 2,934 | 39.22 | 132.8 |
| 23 | 0:03:00 | 24 | 1,854 | 14.90 | 134.6 |
| 24 | 0:03:08 | 14 | 873 | 5.88 | 138.2 |
| 25 | 0:03:17 | 36 | 2,140 | 34.51 | 140.0 |
| 26 | 0:03:25 | 41 | 2,267 | 34.51 | 143.6 |
| 27 | 0:03:33 | 40 | 1,644 | 16.47 | 147.2 |
| 28 | 0:03:41 | 39 | 1,529 | 8.24 | 152.6 |
| 29 | 0:03:49 | 36 | 1,238 | 6.67 | 154.4 |
| 30 | 0:03:58 | 35 | 1,349 | 13.73 | 158.0 |
| 31 | 0:04:06 | 37 | 1,404 | 14.90 | 159.8 |

*FIG. 8F*

View / Accident Log / Stop 5 / Table

| | Elasped Time | MPH |
|---|---|---|
| 1 | -0:00:19 | 61 |
| 2 | -0:00:18 | 60 |
| 3 | -0:00:17 | 58 |
| 4 | -0:00:16 | 58 |
| 5 | -0:00:15 | 57 |
| 6 | -0:00:14 | 56 |
| 7 | -0:00:13 | 53 |
| 8 | -0:00:12 | 50 |
| 9 | -0:00:11 | 46 |
| 10 | -0:00:10 | 45 |
| 11 | - 0:00:09 | 40 |
| 12 | -0:00:08 | 34 |
| 13 | -0:00:07 | 27 |
| 14 | -0:00:06 | 22 |
| 15 | -0:00:05 | 17 |
| 16 | -0:00:04 | 14 |
| 17 | -0:00:03 | 9 |
| 18 | -0:00:02 | 3 |
| 19 | -0:00:01 | 2 |
| 20 | 0:00:00 | 0 |

*FIG. 8H*

MODULE FOR MONITORING VEHICLE OPERATION THROUGH ONBOARD DIAGNOSTIC PORT

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

This invention relates to be on board recordation of operating data from a motor vehicle into a dedicated onboard diagnostic port memory module. More specifically, a "trip oriented" data recordation protocol is actuated during vehicle operation when the dedicated onboard diagnostic port memory module is connected to the onboard diagnostic port of the vehicle. The dedicated onboard diagnostic port memory module can be preprogrammed before placement to the vehicle as to certain critical data parameters to be monitored, placed in vehicle for monitoring over an extended period of time, and finally intelligently interrogated to discharge the recorded data. A detailed record of vehicle and driver operation of a vehicle can be generated from the recorded data.

BACKGROUND OF THE INVENTION

Davis Instruments of Hayward, Calif. has pioneered the onboard recordation of data through a module known as "Drive Right." This device requires custom installation on a vehicle by a skilled mechanic, including a device for monitoring driveshaft rotation and the like. Recordation of data includes counters indicating vehicle operation within certain speed bands and acceleration and deceleration parameters. Purchase and operation of the device requires a motivated buyer willing to pay the cost of the unit as well as to accept the inconvenience and additional expense of vehicle installation. This device finds its highest applicability with owners of "fleets" of automobiles.

So-called Onboard Diagnostic Ports are known and indeed required by The Environmental Protection Agency (EPA). The current device is known as Onboard Diagnostic Port II (hereinafter OBD II). The device is required to enable certain data to be sensed when the OBD II is monitored, and that data is specified by The Society of Automotive Engineers Vehicle Electrical Engineering Systems Diagnostic Standards Committee. The physical configuration of the OBD II output plug is specified (SAE J1962), containing a pin array which is to be electronically monitored. What is not mandated is the language of data transmission, and which pins are to emit the data. The OBD II mandated data to be sensed is contained in a voluminous catalog.

Surprisingly, there are four discrete "languages" (and corresponding pin arrays) now extant in which these OBD II ports now emit data. Those languages are SAE J1850 (GM, Ford), ISO, ISO 9141 (Chrysler and most foreign cars) and KWP 2000 (many 2001 and later foreign cars). For each of the so-called languages, the standard OBD II port has different pins emitting different information in different formats.

The OBD II ports are designed to be connected with standard diagnostic equipment in modern automobile repair shops. It is known to have diagnostic equipment which upon being plugged into the OBD II port, determines the "language" of a particular port, properly addresses the pin array, and finally receives and interprets for the mechanic the specified data required of the OBD II port. It is known that manufacturers have proprietary codes for correspondingly proprietary operating parameters and parts of specific vehicles. Further, it is common to load into standard diagnostic equipment the labels specified by the Diagnostic Standards Committee. When the standard diagnostic equipment detects the data required of the OBD II port, the standard diagnostic equipment gives that particular data a display label which corresponds to the data mandated by the Diagnostic Standards Committee.

OBD II ports are, in some circumstances, monitored by having a computer (for example a laptop or notebook computer) attached to the ports while the vehicle is operating. Typically, a mechanic makes the computer connection, and thereafter drives or runs the vehicle to collect the desired data. Either during operation or once the data is collected, the computer displays the collected data in a programmed format.

As any driver of a modern vehicle can attest, such vehicles have warning systems including malfunction indicator lamps. In the usual case the malfunction indicator lamps are generally uninformative. For example, a typical display of such a malfunction indicator lamps is "Check Engine." Unfortunately, many of these lights are programmed so that they can be turned off only by a dealer. Often the lights are triggered by events that cannot be subsequently determined by the dealer when the light is reset. In short, these lights can be and often are a source of irritation. Even more important, sometimes the lights are activated by very routine automotive conditions, such as a dirty air filter. When such conditions occur, the driver must go to the dealer and pay a "diagnostic fee," have the dealer correct the conditions (for example replace the dirty air filter), and finally retrieve the vehicle from the dealer. A simplification in the operation of such malfunction indicator lamps would be ideal.

The above enumeration of the background and the related problems to the background is specific to the invention disclosed. The reader will recognize that frequently invention can include recognition of the problem(s) to be solved. The background set forth above was selected after the preferred embodiment of this invention was developed.

BRIEF SUMMARY OF THE INVENTION

An onboard diagnostic memory module is configured to plug into the OBD II port and has a real-time clock and power supply, a microprocessor powered from the OBD II port, microprocessor operating firmware, and an attached memory (currently 4 MB). In operation, the onboard diagnostic memory module is preprogrammed with data collection parameters through microprocessor firmware by connection to a PC having programming software for the module firmware. Thereafter, the onboard diagnostic memory module is moved into pin connection with the OBD II port of a vehicle. Data is recorded on a "trip" basis, preferably using starting of the engine to define the beginning of the trip and stopping of the engine to define the end of the trip. EPA-mandated operating parameters are monitored, including vehicle speed. From the monitored vehicle speed, hard and extreme acceleration and deceleration parameters, as well as distance traveled, is determined and logged on a trip basis. When loaded with a typical data set from connection to a vehicle, which can be up to 300 hours of trip operation (about one month of average vehicle operation), the onboard diagnostic memory module is unplugged from the vehicle and plugged into the RS 232 port of a PC. Alternatively, the vehicle installed onboard diagnostic memory module can be intelligently interrogated in a permanent position of installation in a vehicle. The intelligent interrogation occurs by interpretive software from an interrogating PC or palm sized personal digital assistant (PDA) to retrieve a trip-based and organized data set including hard and extreme acceleration and deceleration, velocity (in discrete bands), distance traveled, as well as the required EPA-mandated operating parameters. Telltale printouts can be generated highlighting operator habits (such as hard and extreme deceleration indicating that the driver is following too close), as well as the critical vehicle operating parameters. An extraordinary event log is maintained of densely recorded data based on (probable) accident parameters. Programming of the module can include resetting the malfunction indicator lamps of the vehicle. Installation of the module plugged to the OBD II port does not require vehicle modification.

The device is ideal for monitoring driver habits. The generated plots of vehicle speed bands with respect to time with overlying hard and extreme acceleration and deceleration parameters generates a unique telltale of driver habit including the "following too close." Further, the module is capable of operating on a driver-assigned basis. For example, the driver can be required to connect the module to any vehicle he operates with the module faithfully recording the cumulative operating parameters of the particular vehicle(s), despite language changes at the OBD II ports.

Further, the device can be used to greatly facilitate repair. For example, where a vehicle owner complains of intermittent vehicle behavior, such as a vehicle stalling due to a sticking valve, the module can be plugged into the vehicle for a specific period of time while the vehicle undergoes normal operation by the operator. At the end of a preselected period of time, the module can be returned to a diagnosing PC, the problem determined, and the repair made. In determining the problem, the memory of the operator can be used to pinpoint the particular trip and the probable time of the intermittent malfunction. The mechanic can be directed to the particular data set containing the vehicle operating parameters to diagnose and repair the intermittent vehicle behavior.

The repair simplifications are manifold. For example, trip data sets can be correlated with the memory of the driver. The driver can then supplement the recorded information with his memory to fully reproduce the exact conditions under which a malfunction occurred. Further, where simple malfunction conditions exist, such as dirty air filters, they may be immediately identified and repaired by facilities having less than full vehicle repair capability. A dirty air filter may be replaced at the local gas station. Where a malfunction indicator light such as "Check Engine" is triggered by the dirty air filter, the vehicle operator can reset the malfunction indicator light using the programmed module.

Even more complicated repair scenarios are simplified. For example, when the operating data is downloaded to a PC, data coincident with a complicated malfunction can be isolated, and thereafter transmitted over the Internet to a diagnostic program specific to the vehicle involved. Thereafter, what is ordinarily a complicated diagnosis of vehicle malfunction can be rapidly reported to the mechanic or even to the vehicle operator. For example, for vehicles having custom parts with the OBD II port emitting custom codes, the codes can be sent over the Internet for diagnosis of the particular custom malfunction occurring.

Both the vehicle operator and the vehicle owner can benefit from the device. For example, where a company-owned vehicle is used by an operating employee required to submit expense reports, the combination of the trip-oriented data recordation (including time and trip mileage) with owner- and employee-generated information provides an uncontrovertable record of employee and vehicle operation. Further, where an accident occurs, the module can provide important corroboration to vehicle operating parameters which might otherwise be contested questions of fact related to the accident.

The PC can be interactive with the onboard diagnostic memory module. For example, if the operating firmware in the onboard diagnostic memory module contains a bug, correction can occur. Upon connection to the Internet, the PC can download a discrete program operable on a PC connected to the onboard diagnostic memory module. When the program is downloaded to the PC, it then runs to replace the firmware data set in the onboard diagnostic memory module to either remedy the malfunction or install and upgrade. Further, where enhanced operation of the onboard diagnostic port memory module is required for new vehicles, Internet firmware replacement can rapidly provide the required enhanced operation.

The organization of the collected data into "trip"-oriented data sets is particularly useful. In utilizing the system clock to time and date stamp the collected data with respect to a trip, the particularly useful organization of vehicle speed, acceleration and deceleration, and operating parameters can be collected. This organization, is extraordinarily useful, whether or not the module is removable from the vehicle. For example, provision may be made to download a permanently installed module using the infrared communication feature built into most hand held personal digital assistants (PDAs).

BRIEF DESCRIPTION OF THE DRAWINGS

FIGS. 5A–5E are wiring schematics of the onboard diagnostic port memory module used with this invention with:

FIG. 5A illustrating the microcontroller section;

FIG. 5B illustrating the physical interface to the vehicle for the PWM and VPW protocols;

FIG. 5C illustrating the physical interface to the vehicle for the ISO mode;

FIG. 5D illustrating the optional IrDA interface allowing the module to communicate with a personal digital assistant (PDA); and, FIG. 5E illustrating the actual connection to the vehicle;

FIG. 8C is a tabular presentation all of time, speed, engine speed, coolant temperature, engine load, and battery voltage useful in diagnosing engine operation;

FIG. 8D is a tabular presentation of elapsed time vs. speed from which acceleration and deceleration as well as distance traveled can be determined;

FIG. 8F is a tabular plot of elapsed time, speed, engine speed, engine load, and coolant temperature;

DETAILED DESCRIPTION OF THE INVENTION

Figure 1:
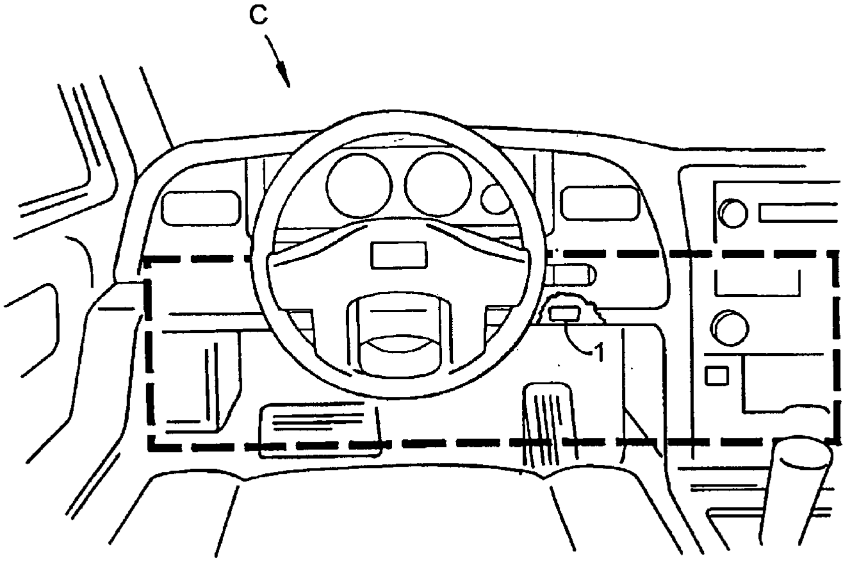
FIG. 1 is a picture of the driver console of an automobile showing an expanded view of the OBD II port, which port is typically under the dashboard near the steering column.

Referring to FIG. 1, a driver console C is shown. An onboard diagnostic port 1 is typically configured under the dashboard adjacent to the steering column.

Figure 2:
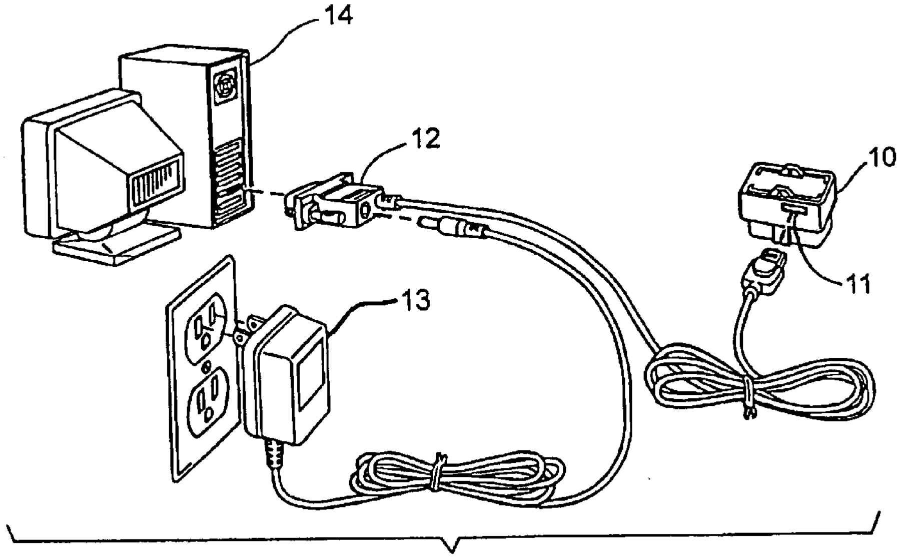
FIG. 2 is an illustration of the onboard diagnostic port being connected to a standard PC.

Referring to FIG. 2, aofn onboard diagnostic port memory module 10 has a 8 pin connector port 11 with a 9 pin connector 12 and power supply 13 for connection to the serial port of a PC 14. At PC 14 data can be conventionally printed, transmitted to the Internet, or otherwise processed. As will be understood, this invention also contemplates reading of data using IrDA ports.

Figure 3A:
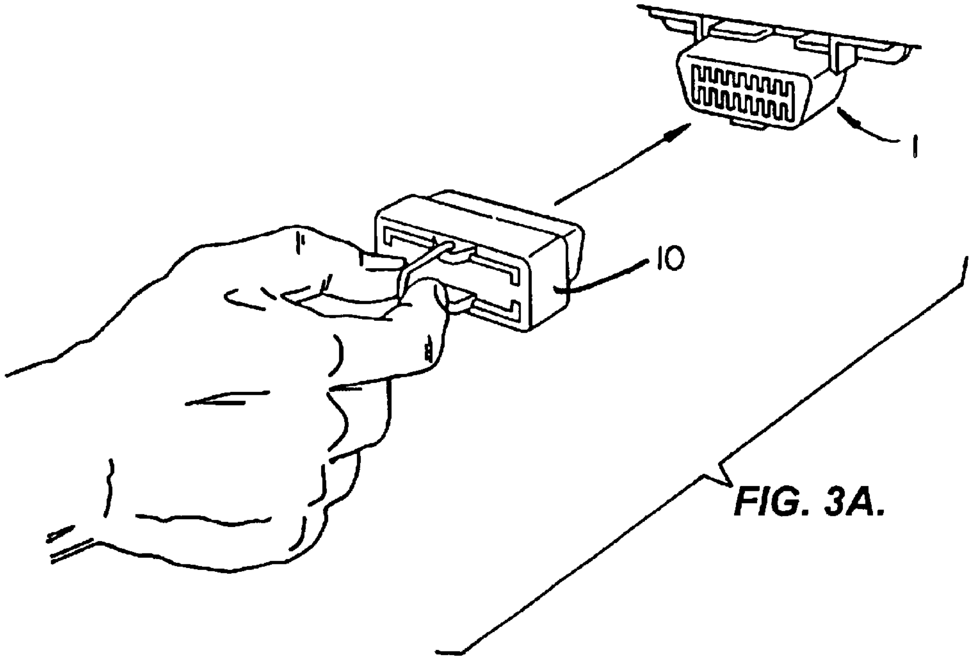
FIGS. 3A and 3B illustrate respectively the onboard diagnostic port memory module being connected to the onboard diagnostic port of an automobile and the connected onboard diagnostic port memory module with an illustrated firmware operated indicator lamp displayed from the module.
Figure 3B:
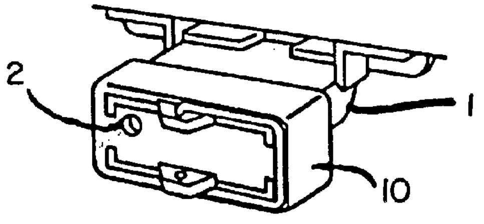

Referring to FIGS. 3A and 3B, the onboard diagnostic port memory module 10 of this invention is illustrated as being plugged into OBD II port 1. In the plugged-in disposition, a firmware operated indicator light 2 can be used for indicating any number of selected functions including the presence of communication between the module 10 and the OBD II port.

Figure 4:
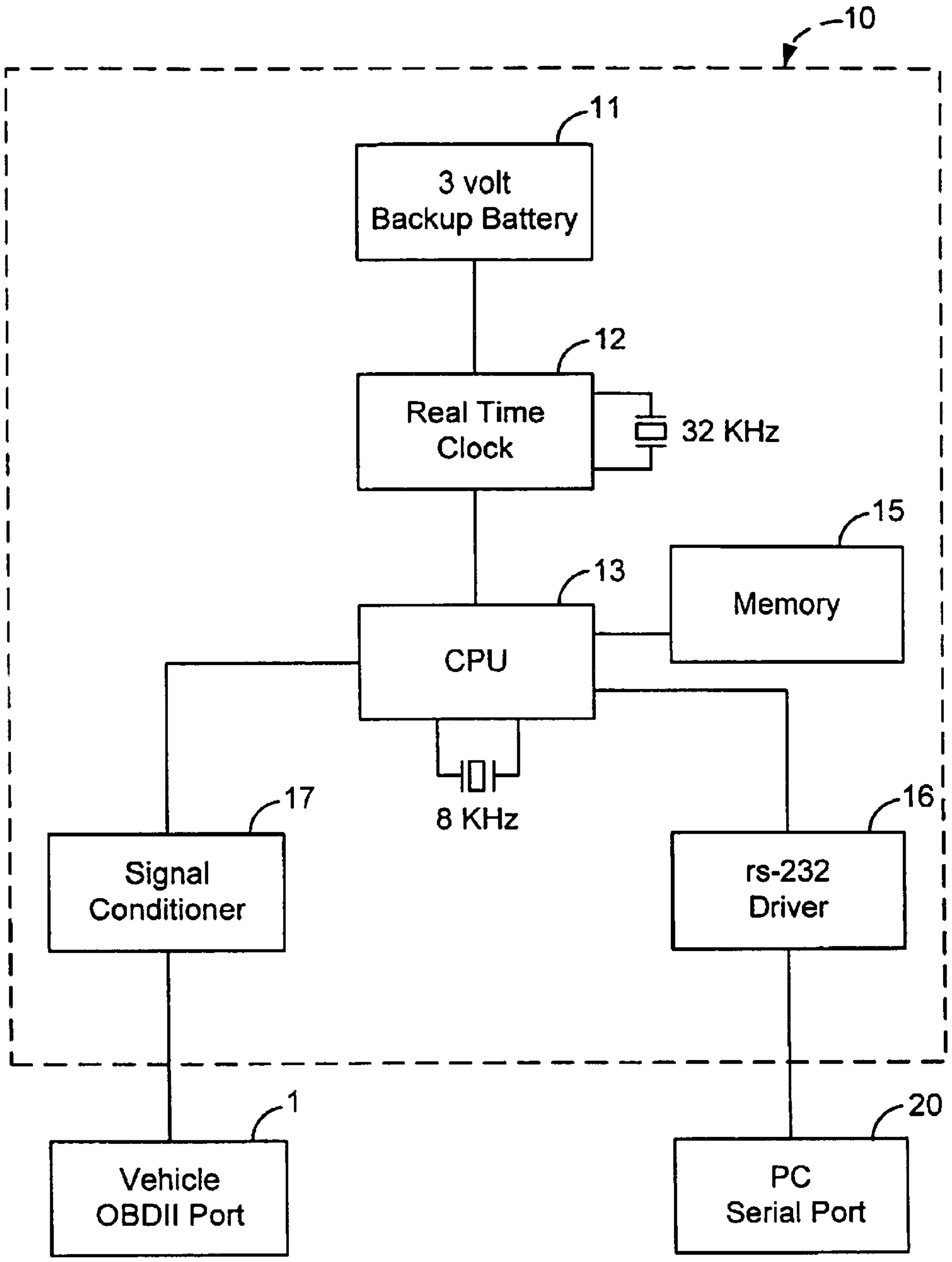
FIG. 4 is a schematic of the onboard diagnostic port memory module indicating the backup battery, clock, the memory, signal conditioner for reading the vehicle onboard diagnostic port, and finally the RS 232 driver for connection to a PC serial port.
Figure 5A:
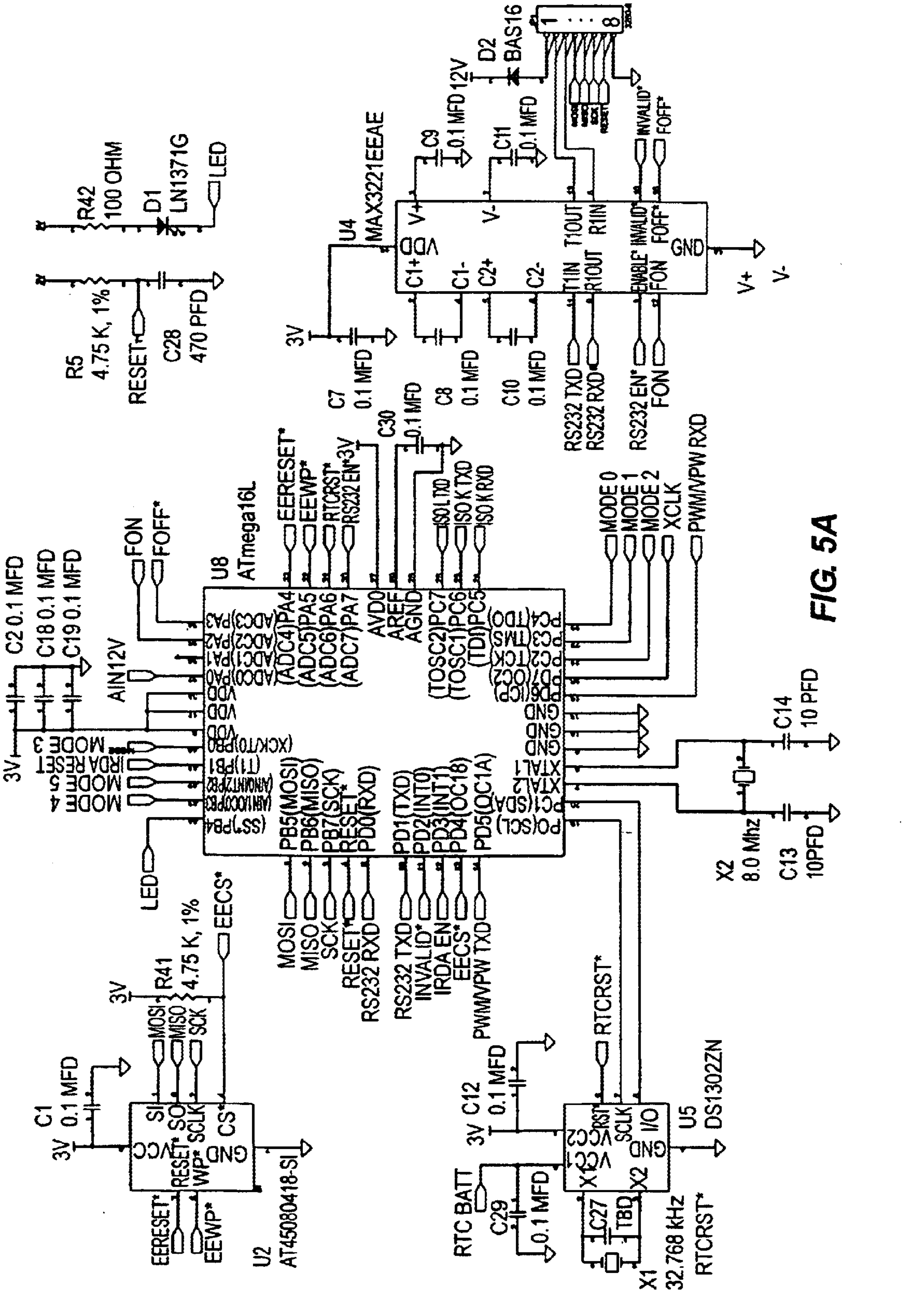
Figure 5B:
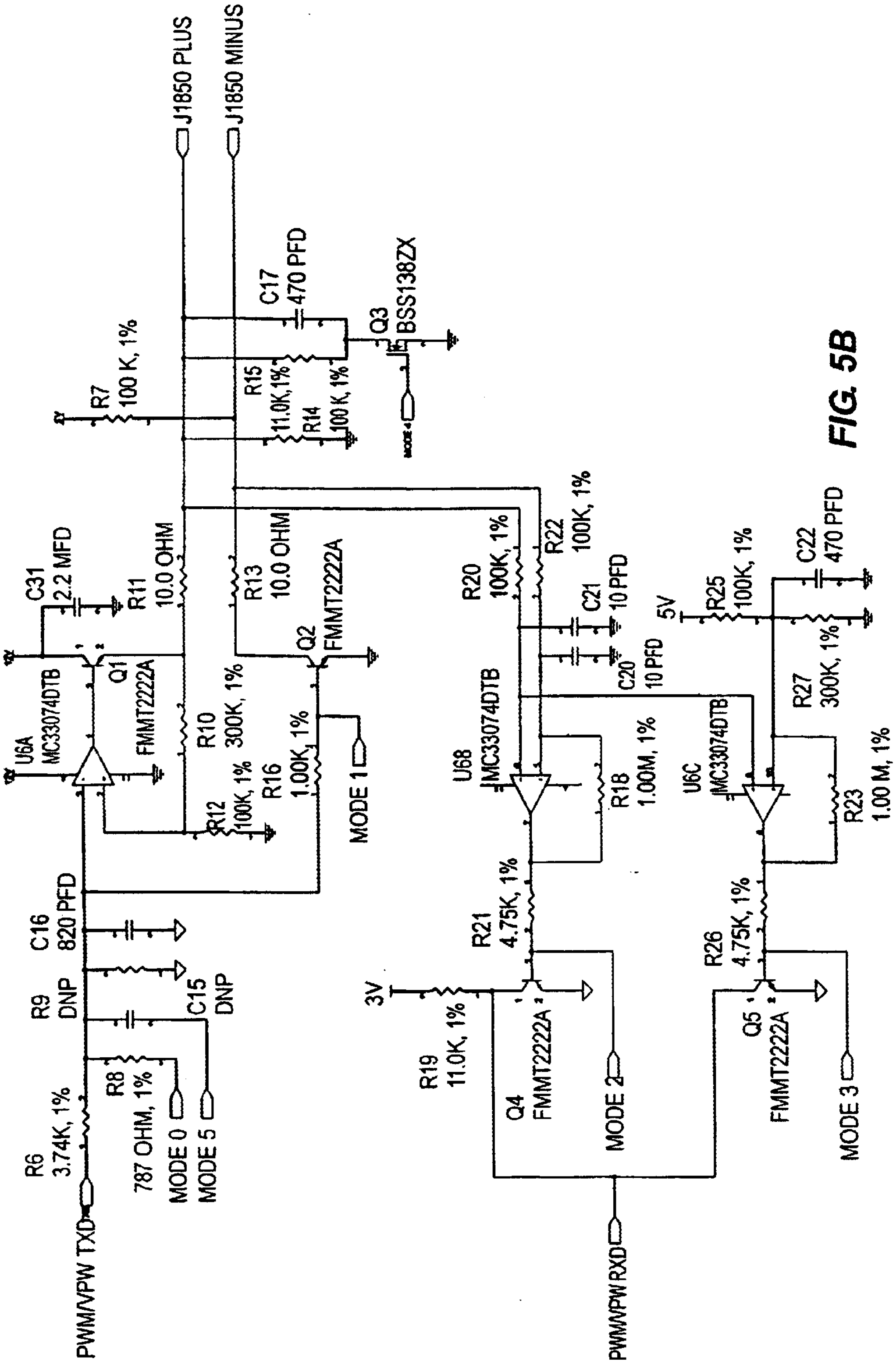
Figure 5C:
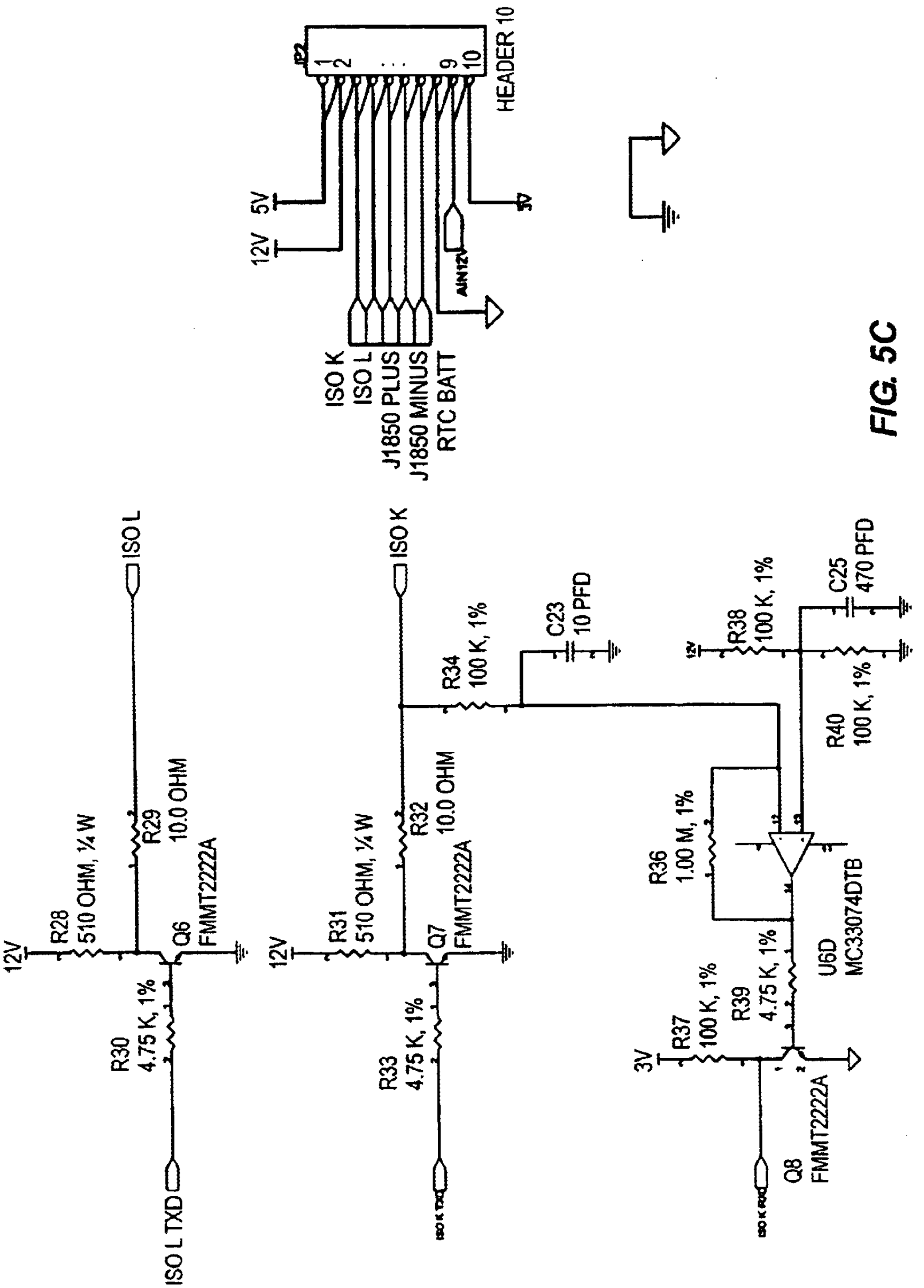
Figure 5D:
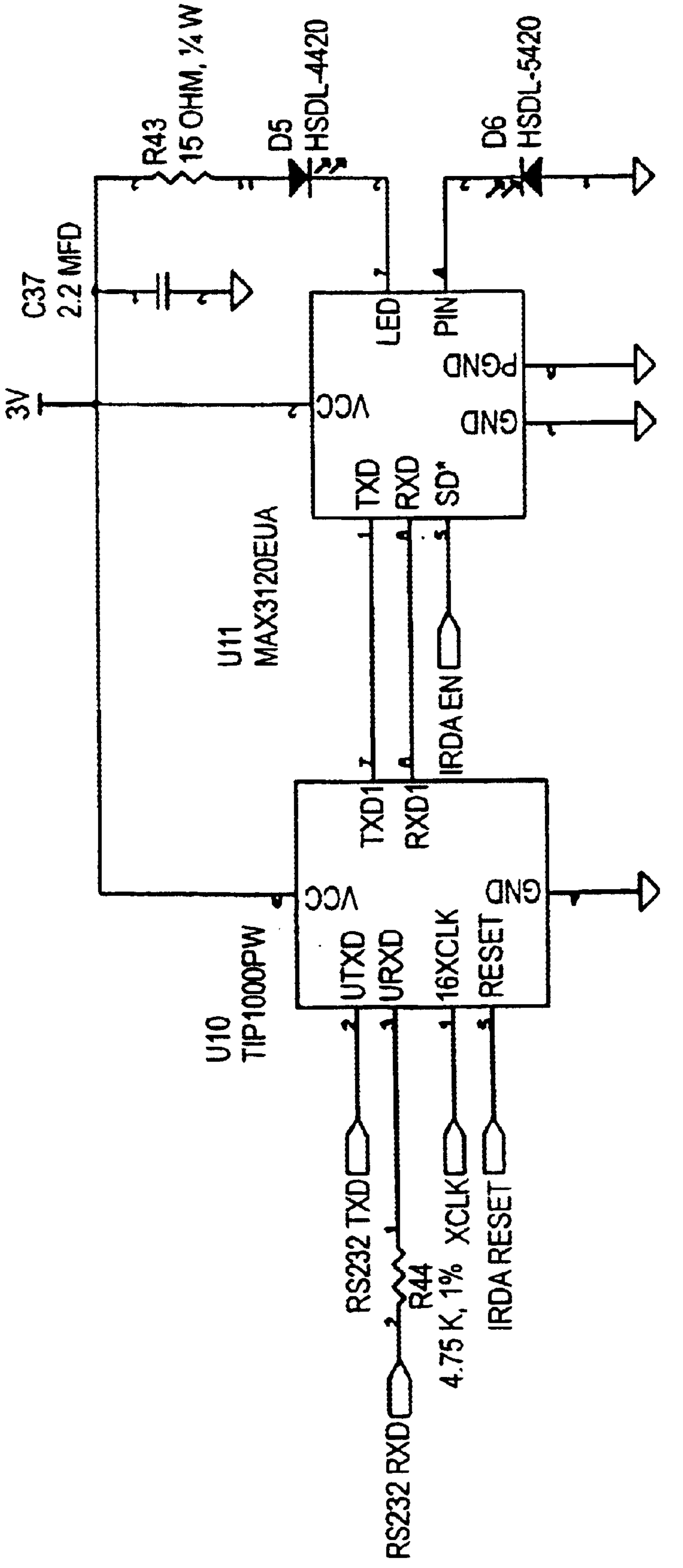
Figure 5E:
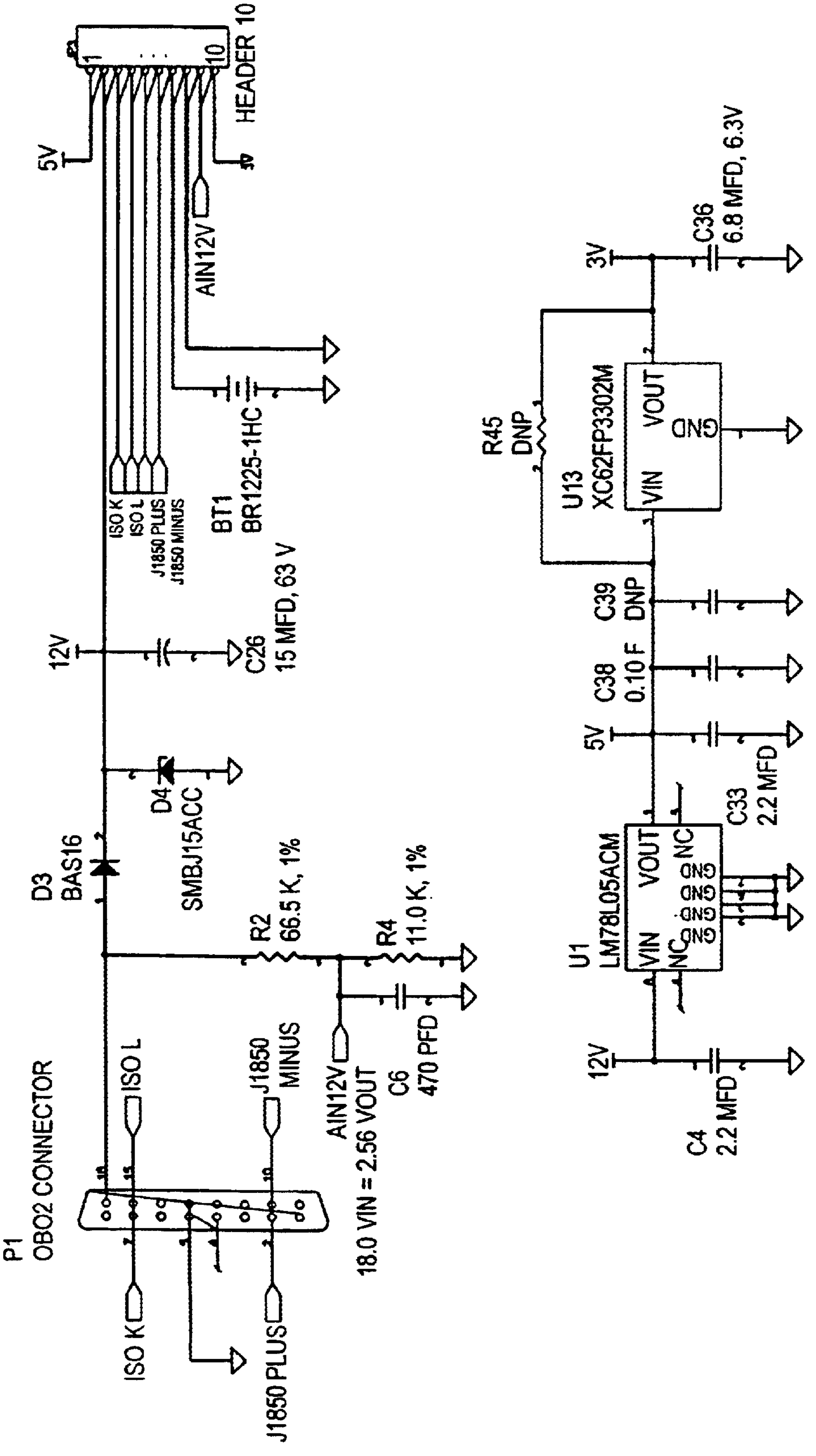

Referring to FIG. 4, a schematic of onboard diagnostic port memory module 10 is illustrated. Three-volt battery 11 operates real-time clock 12 for the purpose of time stamping data. The time signal is given to CPU 13. When the module is connected to the OBD II port, signal conditioner 17 recognizes the particular language emitted by the vehicle and configures module 10 to receive data in the SAE J1850 (GM, Ford), ISO, ISO 9141 (Chrysler and most foreign cars) and KWP 2000 (many 2001 and later foreign cars) formats. Data is then channeled directly to memory 15.

Continuing with FIG. 4, programming and downloading of onboard diagnostic port memory module 10 occurs through PC serial port 20 connection and RS 232 driver 16. During programming, firmware within CPU 13 has parameters set for data recordation. During downloading, inquiry is made through the RS 232 driver for CPU 13 to download memory 15.

Having set forth in the general configuration of onboard diagnostic memory module 10, circuitry for use with this device can be understood with respect to FIGS. 5A through 5E.

There are five major sections to the design of the onboard diagnostic memory module 10 hardware. These are the Microcontroller Section shown in FIG. 5A, the PWM/VPW Physical Layer shown in FIG. 5B, the ISO Physical Layer shown in FIG. 5C, the Optional IrDA Interface shown in FIG. 5D, and the J1962 Interface shown in FIG. 5E.

As of this writing, the onboard diagnostic memory module design contains two printed circuit boards (PCBs), which are stacked on top of each other and connected via a single connector. The "top" board contains sections in FIGS. 5A, B, C, and D above, and the "bottom" board contains section in FIG. 5E.

At present, there are two variations of the onboard diagnostic memory module design: the "basic" version and the "advanced" version. The basic version runs on 5.0V and has a smaller serial flash memory while the advanced version runs on 3.3V and has a larger serial flash memory. Please refer to the schematics for each of the versions.

Bother versions (basic and advanced) support all four types of vehicle protocols using the same hardware: PWM, VPW, and the two variants of ISO. Each section will be described in the sections below.

The microcontroller section forms the heart of the design. U8 is an ATMEL ATmega 16L microcontroller, with on board flash memory, SPI communications bus, and a UART. The microcontroller is supplied with an 8 MHz clock by crystal X2. The microcontroller is powered from 5.0V in the "basic" version of the product, and 3.3V in the "advanced" version.

U2 is an ATMEL serial flash memory chip where the trip log data is stored. The basic version of the onboard diagnostic memory module uses an AT45D011 1 mega-bit memory, while the advanced version uses an AT45DB041B 4 mega-bit part. The serial flash memory is powered from 5.0V in the basic version and 3.3V in the advanced version.

U5 is a Real Time Clock (RTC), which provides a non-volatile time source for the product. When no power is applied to the onboard diagnostic memory module, the RTC is powered from 3V battery BT1 (see J1962 Interface Section). When the onboard diagnostic memory module is powered, power to the RTC is supplied from either 5.0V (basic) or 3.3V (advanced). The clock communicates to the microcontroller (U8) via a two-wire communications bus.

U4 is a RS232 level shifter to provide communications with a PC. U4 has an integral charge pump to generate the proper voltage levels and operates from either 5.0V (basic) or 3.3V (advanced).

JP1 is a connector that provides the link to the PC when the onboard diagnostic memory module 10 is not plugged into the vehicle. There are three types of signals provided on this connector: a) external power, b) RS232 to PC, and c)

SPI bus for development use. Note that diode D2 isolates the external power source from the vehicle power source if they are connected at the same time. The pin assignments are as follows:

| PIN | SIGNAL |
|---|---|
| 1 | External Power (7 to 15 V) |
| 2 | RS232 Output (TXD) |
| 3 | RS232 Input (RXD) |
| 4 | SPI (MOSI) |
| 5 | SPI (MISO) |
| 6 | SPI (SCK) |
| 7 | Microcontroller Reset |
| 8 | Ground |

The PWM/VPW Physical Layer (see FIG. 5B) provides the physical interface to the vehicle for the PWM and VPW protocols. Common parts are shared between the implementation of the two protocols in order to minimize cost and complexity.

U6A is an Operational Amplifier (Op Amp), which drives the J1850 Plus line for both the PWM and VPW modes. It is configured as a non-inverting amplifier with a gain of four (4) and the input on pin 3. Q1 is a NPN transistor and is used to provide a high current drive source.

The components R6, R8, C16, and R16 create a wave shaping network that drive the input of U6A (for the values of these components see the BOM for the basic and advanced models). The input of this network is the output of microcontroller U8 pin 14, PWM/VPW TXD. In the basic mode, this voltage is 5.0V when high and in the advanced model it is 3.3V when high. The output of the network (i.e. the input to U6 pin 3) is 2.0V in VPW mode and 1.25V in PWM mode, resulting in a signal on the J1850 Plus line of 8.0V in VPW mode and 5.0V in PWM mode.

Q2 is a NPN transistor that forms the drive for the J1850 Minus line. In PWM mode, Q2 is actively driven on and off in complement to Q1 thus creating a differential signal between the J1850 Plus and J1850 Minus lines. In VPW mode, Q2 is forced off, leaving the J1850 Minus line disconnected.

R7 and R14 form a bias network for PWM mode. If undriven or disconnected from the vehicle, the J1850 Plus line will be pulled low and the J1850 Minus line will be pulled high (5.0V).

R15, C17, and Q3 create a termination circuit for VPW mode. In VPW mode, Q3 is turned on thus enabling the termination. In PWM mode, Q3 is left off.

U6B and associated circuitry form a differential receiver for PWM mode. R18 provides approximately 10% hysteresis for noise immunity. Q4 provides a level shifter and inverter for the output signal that goes to the microcontroller U8 pin 16 (PWM/VPW RXD).

U6C and associated circuitry form a receiver for VPW mode. The reference value of 3.75V is used to compare against the VPW signal (which is nominally between 8V and 0V). R23 provides about 10% hysteresis for noise immunity, and Q5 creates a level shifter and inverter for the output signal, which is logically “OR’ed” with the signal from Q4 via an open collector configuration.

In PWM mode, Q5 is disabled (MODE3 forced low) and the signal to the microcontroller is derived from Q4. In VPW mode, Q4 is disabled (MODE2 forced low) and the signal to the microcontroller is derived from Q5.

The ISO Physical Layer (see FIG. 5C) provides the physical interface to the vehicle for the ISO mode.

Transistor Q6 (NPN) forms the drive for the ISO L line and Q7 forms the drive for the ISO K line.

U6D and associated circuitry form a receiver for ISO mode. The reference value of approximately 6.0V is used to compare against the ISO K signal (which is nominally between 12V and 0V). R36 provides about 10% hysteresis for noise immunity, and Q8 creates a level shifter and inverter for the output signal, which is connected to the microcontroller U8 pin 24.

JP2 is a socket (row of plated through holes), which provides the connection to the bottom board. The pin assignments are as follows:

| PIN | SIGNAL |
|---|---|
| 1 | 5.0 V Logic Supply |
| 2 | 12 V (vehicle battery voltage) |
| 3 | ISO K |
| 4 | ISO L |
| 5 | J1850 Plus |
| 6 | J1850 Minus |
| 7 | RTC backup battery BT1 |
| 8 | Ground |
| 9 | Battery voltage analog input |
| 10 | 3.3 V Logic Supply |

The Optional IrDA Interface (see FIG. 5D) allows the onboard diagnostic memory module to communicate with a Personal Digital Assistant (PDA) using the wireless IrDA industry standard.

U10 is an “ENDEC” (Encoder/Decoder) chip that converts the serial data from the microcontroller U8 into a pulse train suitable for IrDA communication. U10 is supplied with a clock source equal to 16 times the serial baud rate from U8 pin 16, XCLK.

U11 is an IrDA transceiver that interfaces directly to the IR transmitter (LED D5) and the IR receiver (PIN diode D6).

If populated, both U10 and U11 are supplied from 3.3V in the advanced model, and 5.0V in the basic model.

The J1962 Interface (see FIG. 5E) is the actual connection to the vehicle and is located entirely on the bottom board.

P1 is the OBDII connector that interfaces with the vehicle:

| PIN | SIGNAL |
|---|---|
| 1 | NC |
| 2 | J1850 Plus |
| 3 | NC |
| 4 | NC |
| 5 | Ground |
| 6 | NC |
| 7 | ISO K |
| 8 | NC |
| 9 | NC |
| 10 | J1850 Minus |
| 11 | NC |
| 12 | NC |
| 13 | NC |
| 14 | NC |
| 15 | ISO L |
| 16 | Vehicle Power |

Resistors R2 and R4 form a voltage divider network (18.0 Vin=2.56 Vout) that is used to sense the vehicle battery voltage by the microcontroller U8.

Diode D3 is used to isolate the vehicle power source from the external power source (if connected).

D4 is a Transient Voltage Suppressor (TVS) that is used to prevent voltage surges on the vehicle battery bus from damaging the onboard diagnostic memory module.

BT1 is a primary (non rechargeable) 3V battery cell that is used as the backup power for the RTC U5.

U1 is a 5V regulator used to power the onboard diagnostic memory module circuitry.

C38 is a 0.1 F "supercap" that is used to provide adequate hold up time when the onboard diagnostic memory module is unplugged from the vehicle. This is required so that the microcontroller has enough time to program the flash memory and perform an orderly shutdown before power is lost.

U13 is a 3.3V regulator that is only used in the advanced model. If the unit is a basic mode, R45 is installed instead of U13.

JP3 is the connector the top board that provides the following signals:

| PIN | SIGNAL |
|---|---|
| 1 | 5.0 V Logic Supply |
| 2 | 12 V (vehicle battery voltage) |
| 3 | ISO K |
| 4 | ISO L |
| 5 | J1850 Plus |
| 6 | J1850 Minus |
| 7 | RTC backup battery BT1 |
| 8 | Ground |
| 9 | Battery voltage analog input |
| 10 | 3.3 V Logic Supply |

Figure 6:
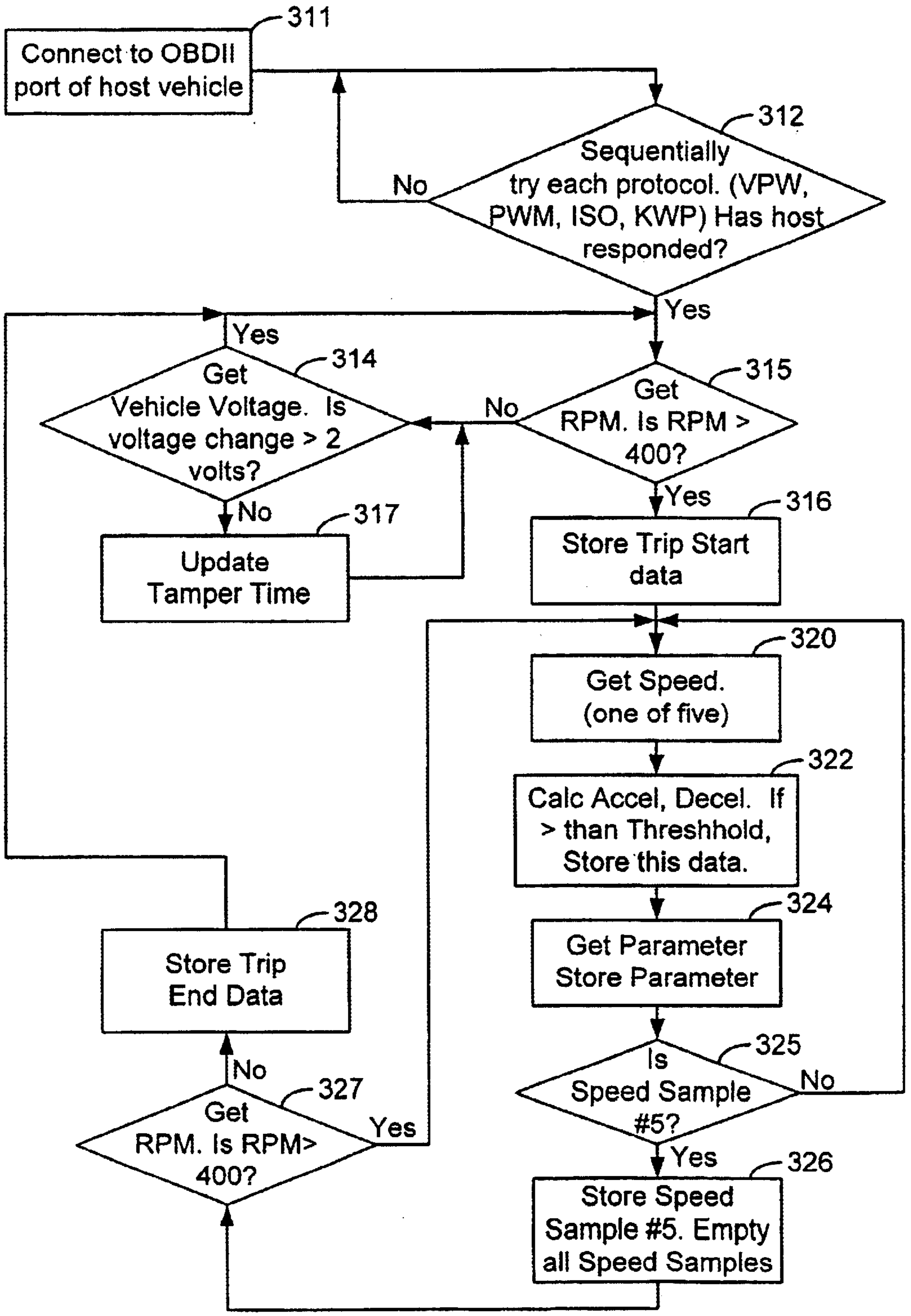
FIG. 6 is a firmware logic diagram of the firmware within the onboard diagnostic port memory module for recordation of data during vehicle operation.

Referring to FIG. 6, a representative firmware logic diagram is illustrated. The reader will understand that the firmware can be upgraded from time to time by the expedient of having PC 14 Internet connected, downloading a program having a new firmware configuration from a web site, running the program in the PC to replacing the firmware in the unit. This type of protocol is preferred as inconsistencies in direct transfer of such a program from the web could interfere with the operation of the onboard diagnostic memory module. As of the writing of this application, the outlined firmware is preferred.

First, the onboard diagnostic port memory module is connected to the OBD II port of the host vehicle and detection of the connection made at 311. Sequentially, each protocol GM [VPW], Ford [PWM], ISO, and Advanced ISO [KWP] is tried at 312 from the onboard diagnostic port memory module to the automobile through the OBD II port 1. When the language of the vehicle is identified, both the pin array and the parameters necessary for reading data passing through the pin array are selected. Data is capable of being read and retained.

Second, onboard diagnostic port memory module 10 must determine the starting of the vehicle. In the protocol used here, where the engine has RPMs above 400, it is presumed that the vehicle is operating. Unfortunately, with at least some vehicles where constant interrogation is made for determining engine revolutions, battery failure can occur. Such battery failure results from the automobile computer being awakened, interrogating the engine for revolutions, and thereafter returning to the standby state. To avoid this effect, vehicle voltage is monitored. Where a starter motor is utilized, vehicle voltage change occurs. Only when vehicle voltage has changed by a predetermined amount, for example down two volts, is interrogation made of engine RPMs. The RPMs are chosen to be greater than those imposed by the starter motor but less than idling speed. Thus, vehicle voltage is detected at 314 and where voltage detection occurs, RPMs are measured at 315. This causes the storage of trip start data at 316.

Third, there is always the possibility of onboard diagnostic module 10 being disconnected from OBD II port 1, say where a driver chooses to have an unmonitored trip. In this case, tampered time 317 is recorded responsive to the drop in voltage caused by the disconnection. However, since engine revolutions will not be monitored in this instance, the data recorded will indicate onboard diagnostic module 10 disconnection from OBD II port 1.

Referring to FIG. 6, monitoring of vehicle speed occurs on a once-a-second basis at speed monitors 320. Thereafter, using previously recorded speeds, acceleration and deceleration is computed at 322. This data is temporarily stored at 324. Normal speed is recorded at 5-second intervals. Therefore, counter 325 asks each fifth speed count to be stored. Further, speed counts one through four are discarded during normal module operation at 326.

Returning to the calculation of acceleration and deceleration at 322, a probable accident log can be maintained. Specifically, and where deceleration has a threshold greater than certain preset limits, and the vehicle speed goes to zero, a log of these unusual events can be maintained. All vehicle events occurring within the previous 20 seconds are remembered in a stack. Data stored in this stack can be subsequently accessed.

It remains for the end of trip to be detected. Specifically, and at the end of each 5-second interval, engine speed is monitored at 327 to determine whether RPMs are above a certain preset limit, here shown as 400 RPMs. This speed is faster than that speed generated by the starter motor but less than the normal speed of the engine when it is idling. If engine speed in the preset amount (over 400 RPMs) is detected, the recordation cycle continues. If the speed is not detected, it is presumed that the trip is ended and the end-of-trip data is stored at 328.

Figure 7:
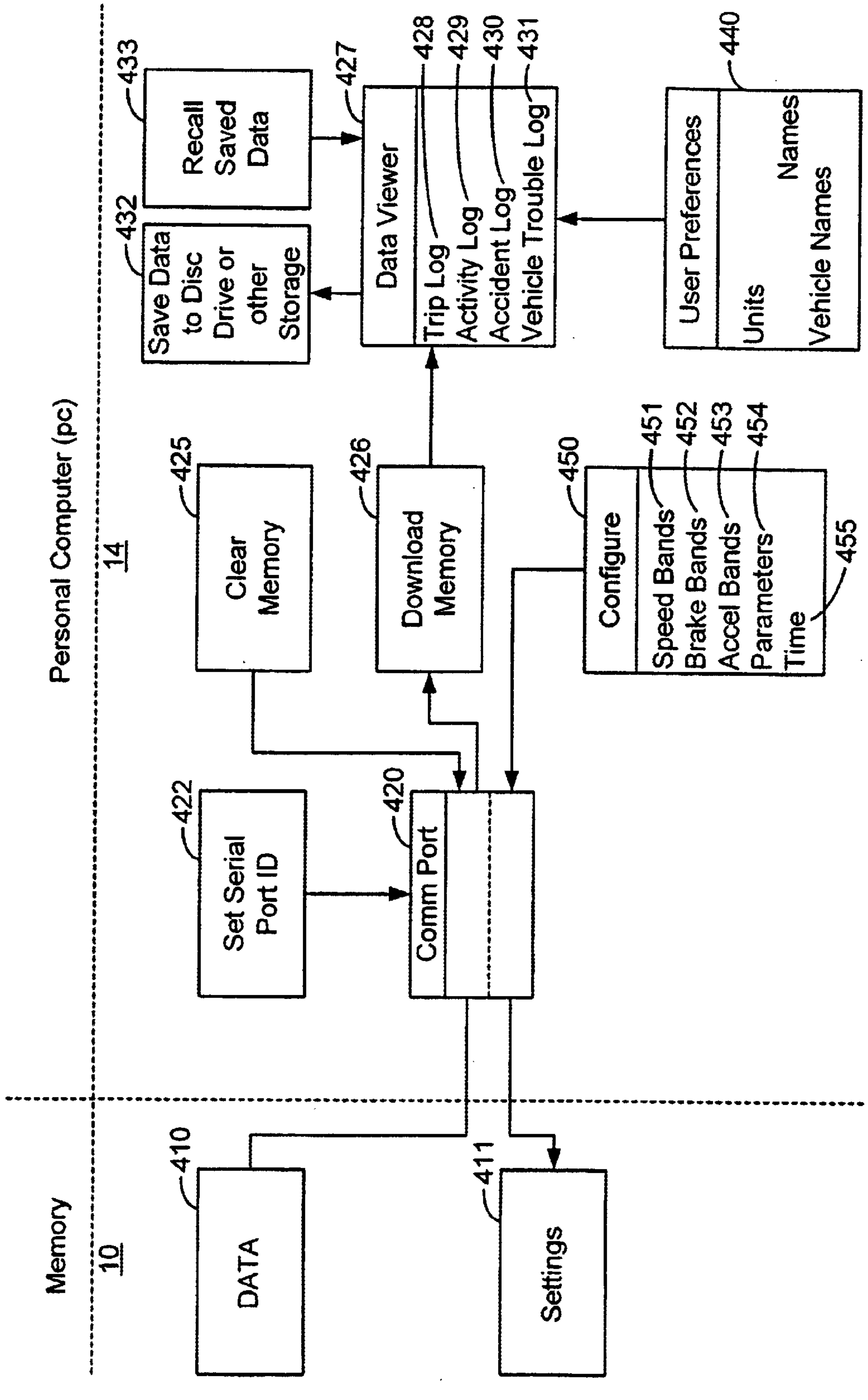
FIG. 7 is a software logic diagram between the onboard diagnostic port memory module and a connected PC for both furnishing the module with settings and downloading data for analysis; and, FIGS. 8A through 8H are representative plots and tables of the recorded data where.

Referring to FIG. 7, the software logic diagram is illustrated. The onboard diagnostic port memory module is schematically illustrated having data 410 and settings 411. A communication port 420 is shown communicating between onboard diagnostic module 10 and personal computer 14. Upon the initial connection to the PC, serial port identification 422 is determined. Thereafter, three discrete functions can be actuated with in onboard diagnostic module 10.

First, the onboard diagnostic module memory can be cleared at 425.

Second, the onboard diagnostic module memory can be downloaded at 426. This can include data viewing 427 of the trip log 428, activity log 429, the accident log 430, and the vehicle trouble log 431. Provision is made to store the accumulated data at 432 and to recover previously stored data at 433. Additionally, provision is made to label the onboard diagnostic module unit number, unit name, and particular vehicle utilized. For example, onboard diagnostic memory module 10 could be assigned to a particular driver, and that driver could have a choice of vehicles to operate. Each time the driver plugged onboard diagnostic memory module 10 into a vehicle to be operated, vehicle identity would be recorded at 440 along with the driver's identification.

Third, the onboard diagnostic port memory module can be configured at 450. Such configuration can include speed bands 451, deceleration or brake bands 452, acceleration bands 453, operational parameters 454, and finally the required time stamping clock setting at 455.

Figure 8A:
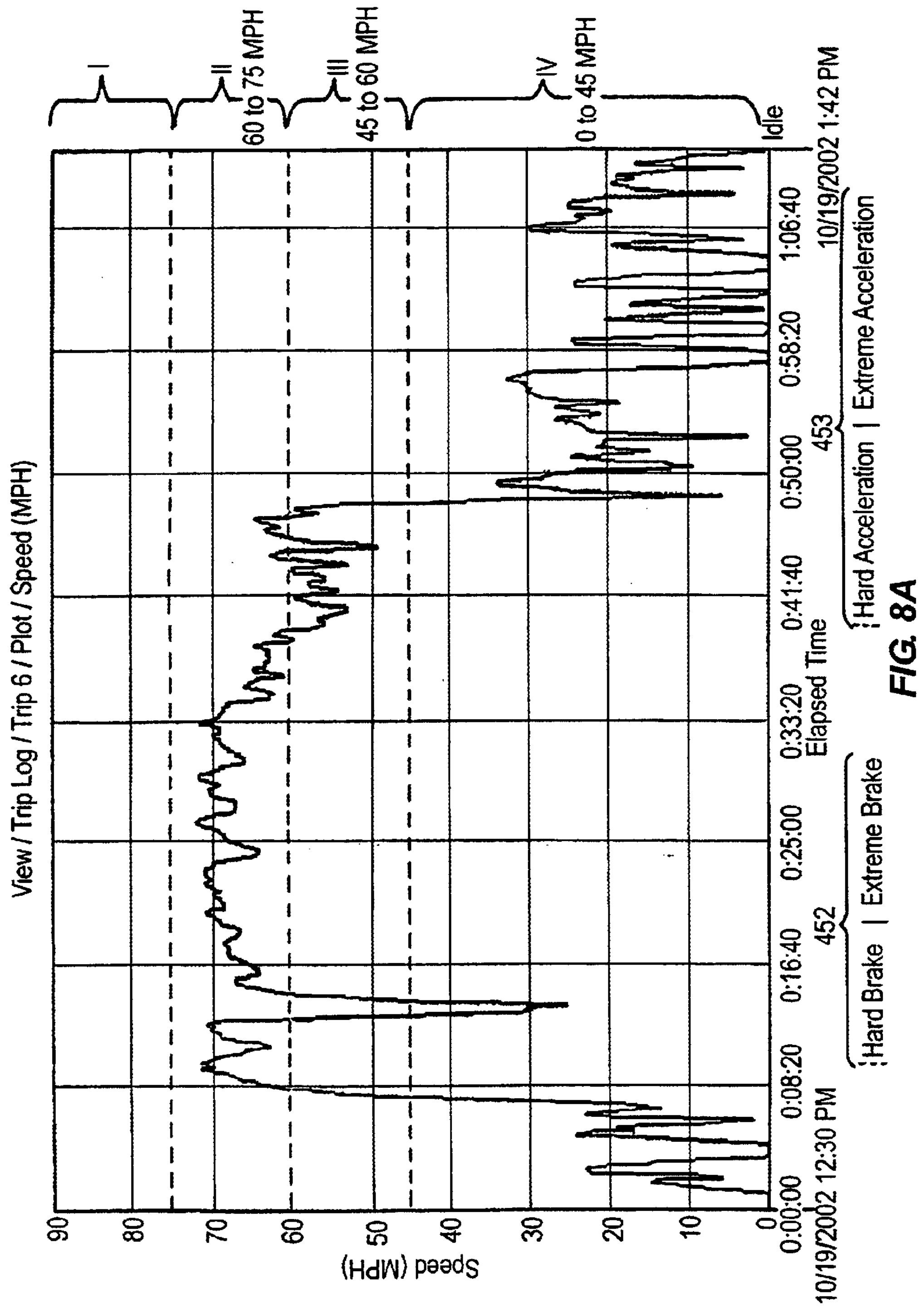
FIG. 8A is a plot of speed against elapsed time indicating normal or conservative driving.
Figure 8B:
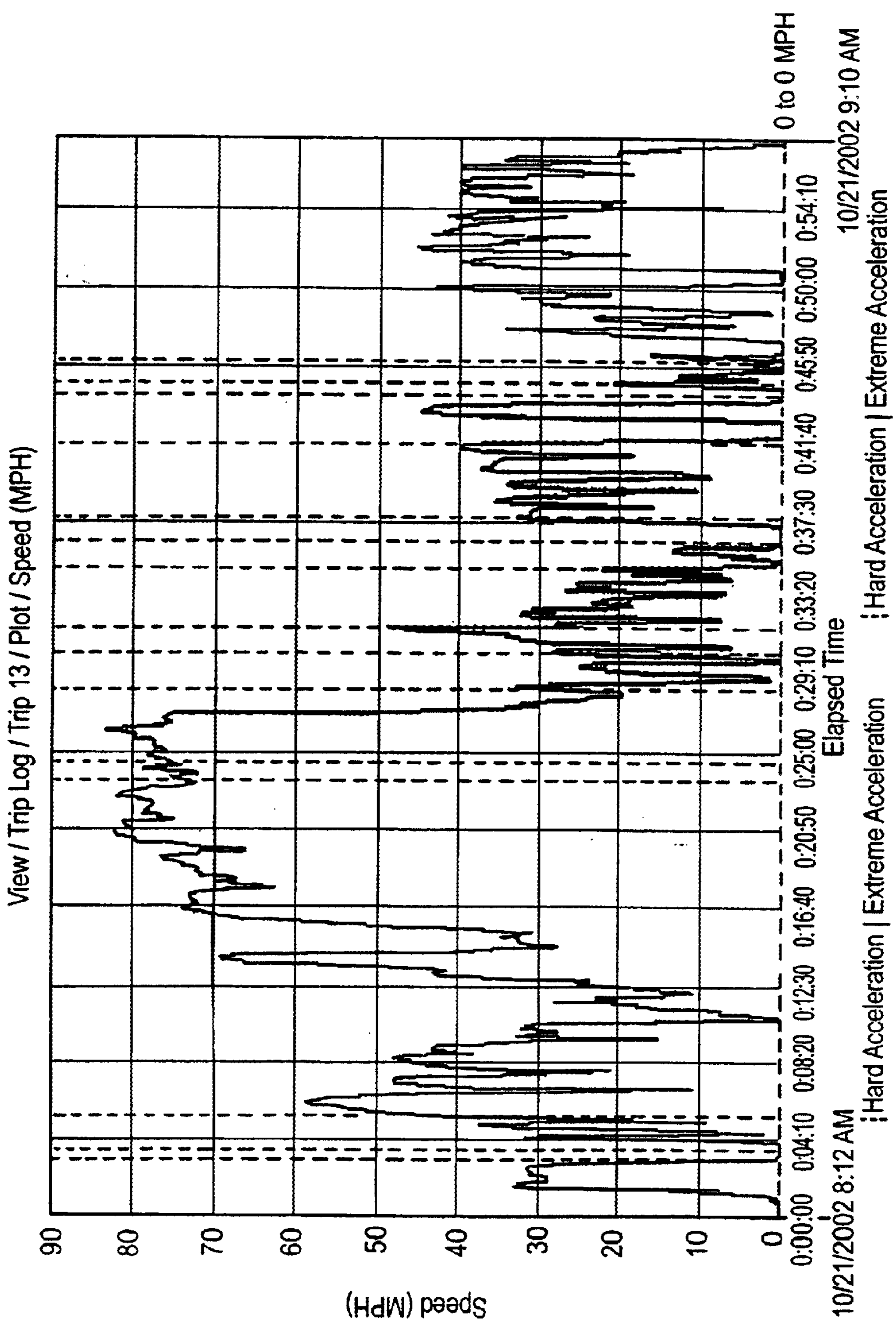
FIG. 8B is a plot of speed against elapsed time indicating abnormal, risk incurring driving with hard and extreme braking and accelerating.

Referring to FIG. 8A, a plot of a car trip is presented. Elapsed time of the trip is plotted against vehicle speed. By way of example, deceleration or brake bands 452 and acceleration bands 453 can be chosen to be 0.28 gravity fields for hard braking and 0.48 gravity fields for extreme braking. Speed bands can likewise be selected. A typical selection could include 75 miles per hour and above [band I], 60 to 75 miles per hour [band II], 45 to 60 miles per hour [band III], and 0 to 45 miles per hour [band IV]. As can be seen in FIGS. 8A and 8B, such information can be graphically presented.

The particular utility of superimposing hard and extreme braking on the display data is apparent with respect to FIGS. 8B. Specifically, the data represented is commonly associated with the driving habit known as "following too close." As can be seen in the plot, numerous braking incidents are recorded in the hard and extreme categories. Additionally, the drive is indicating abuse of the vehicle with rapid accelerations.

Referring to FIG. 8C, a data plot is shown listing elapsed time relative to speed, engine speed, cooling temperature, engine load, and battery voltage.

Referring to FIG. 8D, a plot of elapsed time vs. speed in miles per hour is illustrated. The reader will understand that from such data, both acceleration and deceleration as well as the distance traveled can be determined. In actual practice, speed traveled is frequently recorded. From the frequent recordings, accelerations and decelerations as well as distance traveled are computed, the former by differentiation and the latter by integration. Once this data is accumulated, intermediate velocity points can be discarded with the remaining velocity points being maintained in a table such as fat shown in FIG. 8D.

Figure 8E:
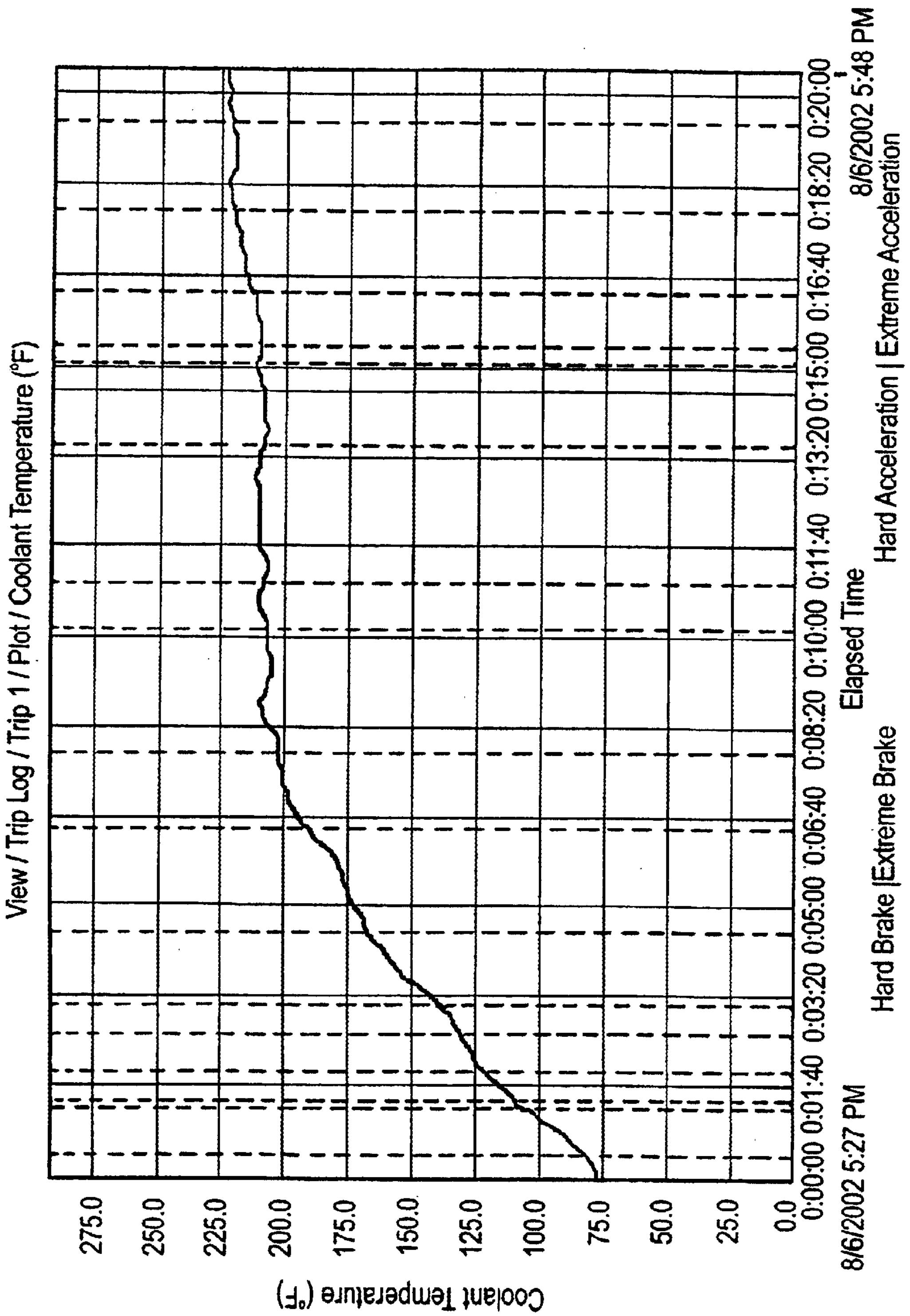
FIG. 8E is a graphical plot of coolant temperature vs. elapsed time for diagnosing engine temperature and thermostat operation.

Referring to FIG. 8E, a plot of cooling temperature vs. time for a trip is illustrated. In this plot, possible malfunction of an automobile thermostat is illustrated.

Referring to FIG. 8F, a tabular plot of elapsed time, speed, engine speed, engine load, and cooling temperature is shown. It should be understood that through conventional manipulation of PC software, arrays of data can be presented in any desired format.

Figure 8G:
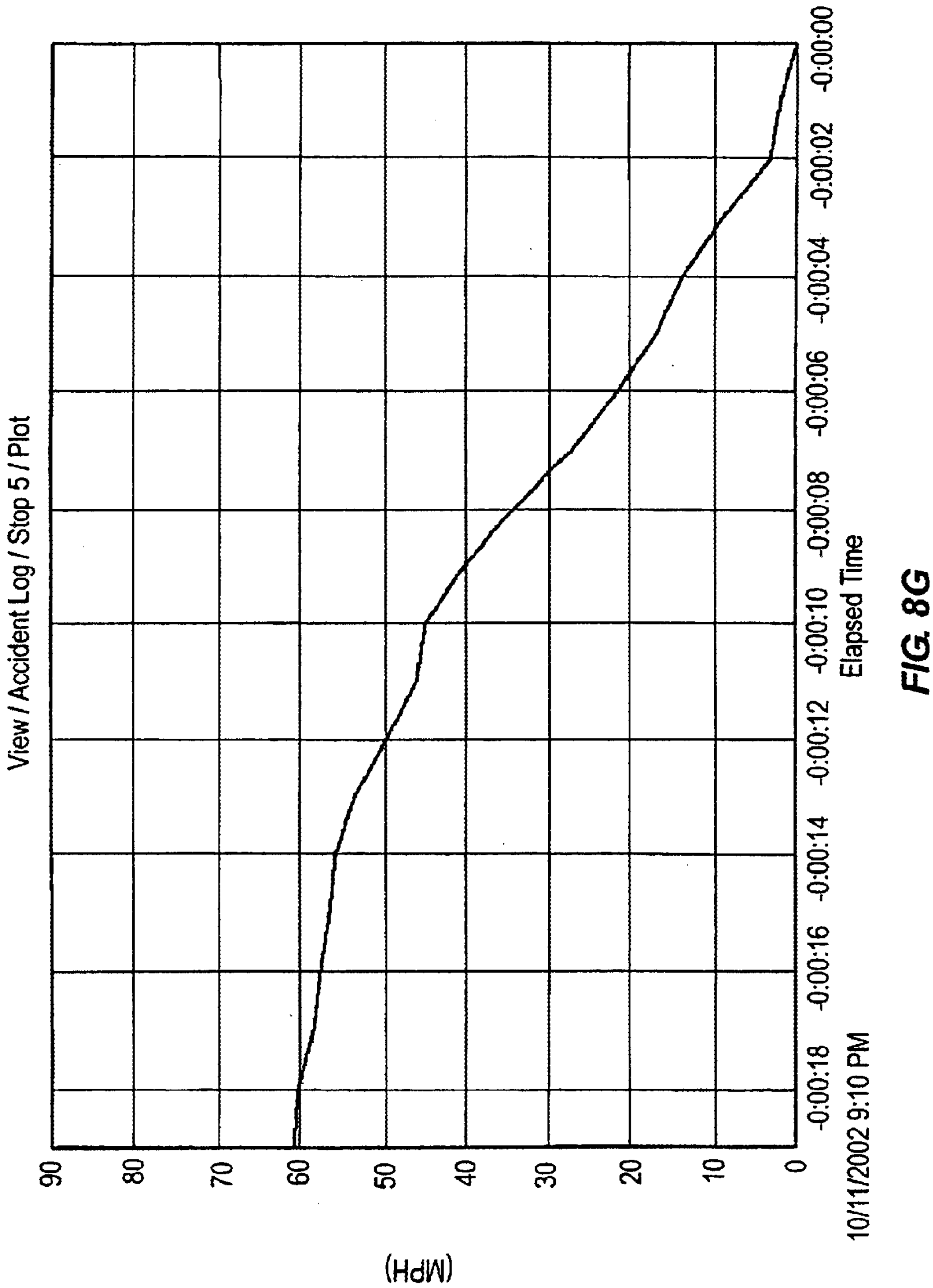
FIG. 8G is a graphical plot of data triggering operation of an accident log wherein operating parameters are stored in a first in, last out stack for preserving data indicating a possible accident and, FIG. 8H is a tabular presentation of the data triggering operation of the accident log.

Referring to FIGS. 8G and 8H, and then triggering an "accident log" is respectively graphically and tabularly illustrated. It can be immediately seen that the event here is triggered by rapid deceleration. When such a profile is detected by the disclosed onboard diagnostic port memory module, all operating data is preserved in a dense format. Further, the operating data in its dense format is transferred to a first in, last out data stack having capacity in the usual case for between 30 and 32 such events. In this manner, the onboard diagnostic memory module can maintain for a substantial period of time operating vehicle profiles for accident situations. Thus, with the onboard diagnostic memory module of this invention, vehicle operating parameters that would be questions of controverted fact in the normal accident situations become unquestioned recorded data.

It is to be understood that the parameters for triggering an accident log recordation can be altered.

What is claimed is:

1. An onboard diagnostic memory module for an onboard diagnostic port of a vehicle comprising:

a connection to an onboard diagnostic port output of a vehicle;

a memory for receiving and emitting recorded data from the connection to the onboard diagnostic port output of the vehicle;

apparatus for time stamping the recorded data in the memory for receiving and emitting recorded data;

a microprocessor responsive to operational firmware for manipulating data to and from the memory through the connection to the onboard diagnostic port output of the vehicle;

memory operationally connected to the microprocessor for receiving the operational firmware;

the operational firmware including:

data receiving and recording parameters for the memory during the connection to the onboard diagnostic port output of the vehicle; and, discharge parameters for discharging the recorded data responsive to intelligent interrogation of a computer having a connection to the onboard diagnostic memory module; and, resetting parameters for a malfunction indicator light.

2. An onboard diagnostic memory module for an onboard diagnostic port of a vehicle comprising: a connection to an onboard diagnostic port output of a vehicle;

a memory for receiving and emitting recorded data from the connection to the onboard diagnostic port output of the vehicle;

apparatus for time stamping the recorded data in the memory for receiving and emitting recorded data;

a microprocessor responsive to operational firmware for manipulating data to and from the memory through the connection to the onboard diagnostic port output of the vehicle;

memory operationally connected to the microprocessor for receiving the operational firmware;

the operational firmware including:

data receiving and recording parameters for the memory during the connection to the onboard diagnostic port output of the vehicle;

discharge parameters for discharging the recorded data responsive to intelligent interrogation of a computer having a connection to the onboard diagnostic memory module;

interrogating language software for determining the language of the onboard diagnostic port.

3. The onboard diagnostic memory module of claim 2 and wherein:

the operational firmware further includes:

interrogating language software for determining the language of the onboard diagnostic port selected from the group consisting of GM, Ford, ISO, and KWP 2000.

4. A process of recording and analyzing data from the combination of an onboard diagnostic memory module, a vehicle having an onboard diagnostic port, and a computer having intelligent programming for the onboard diagnostic memory module comprising:

providing a vehicle having an onboard diagnostic port for emitting data;

providing an onboard diagnostic memory module including:

a connection to an onboard diagnostic port output of a vehicle;

a memory for receiving and emitting recorded data from the connection to the onboard diagnostic port output of the vehicle;

apparatus for time correlation to the recorded data in the memory for receiving and emitting recorded data;

a microprocessor responsive to operational firmware for manipulating data to and from the memory through the connection to the onboard diagnostic port output of the vehicle;

memory operationally connected to the microprocessor for receiving the operational firmware;

the operational firmware including:

data receiving and recording parameters for the memory during the connection to the onboard diagnostic port output of the vehicle; and, discharge parameters for discharging the recorded data responsive to intelligent interrogation of a computer having a connection to the onboard diagnostic memory module;

providing a computer having:

interrogation parameters for the onboard diagnostic memory module; and, emitting data receiving and recording parameters to the onboard diagnostic port memory module;

connecting the onboard diagnostic memory module to the computer to receive the data receiving and recording parameters;

sending from the computer to the onboard diagnostic memory module the data receiving and recording parameters;

connecting the onboard diagnostic memory module to the vehicle at the onboard diagnostic port;

recording data during operation of the vehicle at the onboard diagnostic port;

time stamping the recorded speed data with time;

connecting the onboard diagnostic memory module to the computer; and, interrogating the onboard diagnostic memory module to recover the recorded time stamped speed data;

downloading the time stamped speed data from the onboard diagnostic port of the vehicle to a computer; and, plotting the speed data versus time on a computer; and, superimposing indicia of acceleration and/or deceleration.

5. A process for recording to an onboard diagnostic port memory module for an onboard diagnostic port of a vehicle, the process comprising:

providing an onboard diagnostic port memory module having:

a connection to an onboard diagnostic port output of a vehicle;

a memory for receiving and emitting recorded data from the connection to the onboard diagnostic port output of the vehicle;

apparatus for time stamping the recorded data in the memory for receiving and emitting recorded data;

a microprocessor responsive to operational firmware for manipulating data to and from the memory through the connection to the onboard diagnostic port output of the vehicle;

memory operationally connected to the microprocessor for receiving the operational firmware;

the operational firmware including:

data receiving and recording parameters for the memory during the connection to the onboard diagnostic port output of the vehicle; and, discharge parameters for discharging the recorded data responsive to intelligent interrogation of a computer having a connection to the onboard diagnostic port memory module;

monitoring the engine for engine operation;

recording data for a trip upon starting of engine operation;

ceasing recording of data for a trip upon ceasing the engine operation;

maintaining vehicle operational parameters between the starting of the engine and the stopping of the engine as a block of data indicating a trip;

reading speed data during the trip;

recording in the memory for receiving and emitting the speed data the speed data during the trip; and, integrating the recorded speed data to determine distance traveled during the trip; and, differentiating the recorded speed data to determine acceleration and deceleration during the trip.

6. The process for recording to an onboard diagnostic port memory module according to claim 5 including the further step of:

presenting acceleration and deceleration during the trip in hard and extreme bands after the trip.

7. The process for recording to an onboard diagnostic port memory module according to claim 5 including the step of:

recording the time of the trip in the block of data indicating the trip.

8. A process of presenting a graphical record of driver performance comprising the steps of:

providing a clock for providing timestamps;

providing an output of speed;

providing a memory for receiving timestamps and an output of speed;

reading speed data;

differentiating the recorded speed data to determine acceleration and deceleration; and, recording in the memory for receiving timestamps and an output of speed the acceleration and/or deceleration during a trip; and, plotting timestamps versus speed with indicia indicating acceleration and/or deceleration during the trip.

9. The process of presenting a graphical record of driver performance according to claim 8 comprising the step of:

plotting the indicia of acceleration and/or deceleration in discrete bands of acceleration and/or deceleration exceeding predetermined acceleration and/or deceleration limit.

10. An onboard diagnostic memory module for an onboard diagnostic port of a vehicle comprising:

a connection to an onboard diagnostic port output of a vehicle;

a memory for receiving and emitting recorded data from the connection to the onboard diagnostic port output of the vehicle;

apparatus for time stamping the recorded data in the memory for receiving and emitting recorded data;

a microprocessor responsive to operational firmware for manipulating data to and from the memory through the connection to the onboard diagnostic port output of the vehicle;

memory operationally connected to the microprocessor for receiving the operational firmware;

the operational firmware including:

data receiving and recording parameters for the memory during the connection to the onboard diagnostic port output of the vehicle;

discharge parameters for discharging the recorded data responsive to intelligent interrogation of a computer having a connection to the onboard diagnostic memory module; and, apparatus for activating the data receiving and recording parameters upon sensing the electric voltage of the automobile electrical system at a depressed voltage.

11. The onboard diagnostic memory module for an onboard diagnostic port of a vehicle according to claim 10 and wherein the depressed voltage of the automobile electrical system is at least two volts.

12. The onboard diagnostic memory module for an onboard diagnostic port of a vehicle according to claim 10 and wherein interrogation is made for engine RPM upon sensing a depressed voltage.

13. A process of recording to and analyzing data from an onboard diagnostic memory module, a vehicle having an onboard diagnostic port comprising:

providing a vehicle having an onboard diagnostic port for emitting data;

providing an onboard diagnostic memory module including:

a connection to an onboard diagnostic port output of a vehicle;

a memory for receiving and emitting recorded data from the connection to the onboard diagnostic port output of the vehicle;

apparatus for time correlation to the recorded data in the memory for receiving and emitting recorded data;

a microprocessor responsive to operational firmware for manipulating data to and from the memory through the connection to the onboard diagnostic port output of the vehicle;

memory operationally connected to the microprocessor for receiving the operational firmware;

the operational firmware including:

data receiving and recording parameters for the memory during the connection to the onboard diagnostic port output of the vehicle; and, discharge parameters for discharging the recorded data responsive to intelligent interrogation of a computer having a connection to the onboard diagnostic memory module;

connecting the onboard diagnostic memory module to the vehicle at the onboard diagnostic port;

sensing the beginning of the operation of a vehicle by sensing low voltage in the electrical system of the automobile and revolutions of the engine in the automobile above a predetermined limit;

recording data during operation of the vehicle at the onboard diagnostic port; and, ceasing recording upon sensing revolutions of the engine below a predetermined limit.

* * * * *